United States Patent
Leprince et al.

(10) Patent No.: US 8,452,123 B2
(45) Date of Patent: May 28, 2013

(54) DISTORTION CALIBRATION FOR OPTICAL SENSORS

(75) Inventors: Sebastien Leprince, Pasadena, CA (US); Pablo Muse', Montevideo (UY); Jean-Philippe Avouau, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 495 days.

(21) Appl. No.: 12/340,696

(22) Filed: Dec. 20, 2008

(65) Prior Publication Data

US 2010/0232638 A1    Sep. 16, 2010

Related U.S. Application Data

(60) Provisional application No. 61/011,671, filed on Jan. 18, 2008, provisional application No. 61/066,407, filed on Feb. 20, 2008.

(51) Int. Cl.
*G06K 9/36*    (2006.01)

(52) U.S. Cl.
USPC ........................................................ 382/276

(58) Field of Classification Search
USPC ................... 382/151, 256, 289, 276
See application file for complete search history.

(56) References Cited

U.S. PATENT DOCUMENTS

| | | | |
|---|---|---|---|
| 6,084,989 A | 7/2000 | Eppler | |
| 6,373,970 B1 | 4/2002 | Dong et al. | |
| 6,735,348 B2 * | 5/2004 | Dial et al. | 382/293 |
| 6,928,194 B2 * | 8/2005 | Mai et al. | 382/284 |
| 7,046,934 B2 | 5/2006 | Badesha et al. | |
| 7,630,579 B2 | 12/2009 | Mai et al. | |
| 7,642,953 B2 | 1/2010 | Cheng et al. | |
| 7,725,258 B2 * | 5/2010 | Smitherman | 701/213 |
| 7,873,240 B2 | 1/2011 | Oldroyd | |
| 2003/0044085 A1 * | 3/2003 | Dial et al. | 382/293 |
| 2010/0232728 A1 * | 9/2010 | Leprince et al. | 382/294 |

OTHER PUBLICATIONS

A. Almansa, B. Rouge, and S. Jaffard, "Irregular sampling in satellite images and reconstruction algorithms," in *Proc. 35th CANUM*, Jun. 2003. [Online]. Available: http://www.fing.edu.uy/~almansa/HDRI_Almansa2003-CANUM-psample.pdf.

Z. Altamini, P. Sillard, and C. Boucher, "ITRF 2000: A new release of the international terrestrial reference frame for Earth sciences applications," *J. Geophys. Res.*, vol. 107, No. BI0, p. 2214, 2002.

*ASTER User's Guide, Part I*, Earth Remote Sensing Data Analysis Center, Tokyo, Japan, 2001.

*ASTER User's Guide, Part II*, Earth Remote Sensing Data Analysis Center, Tokyo, Japan, 2001.

(Continued)

*Primary Examiner* — Tarifur Chowdhury
*Assistant Examiner* — Jonathan Hansen
(74) *Attorney, Agent, or Firm* — Steinfl & Bruno LLP

(57) ABSTRACT

A method for calibrating an imaging instrument, possibly located on an aircraft or satellite, is described. According to the method, an image acquired by the instrument is ortho-rectified, and then co-registered and correlated with a reference image. In this way, ground disparities between the acquired image and the reference image are measured. Updated instrument pointing directions that correct for the disparities measured are then determined and adopted as corrective calibrations for the distortions of the instrument.

13 Claims, 4 Drawing Sheets

OTHER PUBLICATIONS

J. P. Avouac, F. Ayoub, S. Leprince, O. Konca, and D. Helmberger, "The 2005, Mw 7.6 Kashmir earthquake, rupture kinematics from sub-pixel correlation of ASTER images and seismic waveforms analysis," *Earth Planet. Sci. Lett.*, vol. 249, No. 3/4, pp. 514-528, 2006.

E. Baltsavias, Z. Li, and H. Eisenbeiss, "DSM generation and interior orientation determination of IKONOS images using a testfield in Switzerland," in *Proc. ISPRS Workshop High-Resolution Earth Imaging Geospatial Inj.*, Hannover, Germany, 2005.

J. Barzilai and I. Borwein, "Two-point step size gradient methods," *IMA J. Numer. Anal.*,vol. 8,No. I,pp. 141-148, 1988.

E. Berthier, H. Vadon, D. Baratoux, Y. Arnaud, C. Vincent, K. Feigl, F. Remy, and B. Legresy, "Surface motion of mountain glaciers derived from satellite optical imagery," *Remote Sens. Environ.*, vol. 95, No. 1, pp. 14-28, 2005.

R. Binet and L. Bollinger, "Horizontal coseismic deformation of the 2003 Bam (Iran) earthquake measured from SPOT-5 THR satellite imagery," *Geophys. Res. Lett.*, vol. 32, No. 2, pp. L02307.1-L02307.4, 2005.

A. Bouillon, E. Breton, F. D. Lussy, and R. Gachet, "SPOT5 HRG and HRS first inflight geometry quality results," in *Proc. SPIE-Sensors, Systems, Next-Generation Satellites VI*, 2003, vol. 4881, pp. 212-223.

E. Breton, A. Bouillon, R. Gachet, and F. Delussy, "Pre-flight and in-flight geometric calibration of SPOT5 HRG and HRS images," in *Proc. ISPRS Commission I Symp., Pecora I5/Land Satellite Inj. IV Conj.*, Denver, CO, 2002.

N. Bryant, A. Zobrist, and T. Logan, "Automatic co-registration of spacebased sensors for precision change detection and analysis," inProc. *IGARSS*, Jul. 2003, vol. 2, pp. 1371-1373.

H. Carfantan and B. Rouge, "Estimation non biaisee de decalages subpixelaire sur les images SPOT," in *Proc. Colloque GRETSI*, Toulouse, France, Sep. 2001.

L. Chen and L. Lee, "Rigorous generation of digital orthophotos from SPOT images," *Photogramm. Eng. Remote Sens.*, vol. 59, No. 5, pp. 655-661, 1993.

R. Crippen and R. 810m, "Measurement of subresolution terrain displacements using SPOT panchromatic imagery," inProc. *IGARSS*, Jun. 1991, vol. 3, pp. 1667-1670.

Dai and S. Khorram, "Effects of image misregistration on the accuracy of remotely sensed change detection," *IEEE Trans. Geosci. Remote Sens.*, vol. 36, No. 5, pp. 1566-1577, Sep. 1998.

N. Dodgson, "Quadratic interpolation for image resampling," *IEEE Trans. Image Process.*, vol. 6,No. 9,pp. 1322-1326,Sep. 1997.

S. Dominguez, J.-P. Avouac, and R. Michel, "Horizontal coseismic deformation of the 1999 Chi-Chi earthquake measured from SPOT satellite images; implications for the seismic cycle along the western foothills of central Taiwan," *J Geophys. Res.*, vol. 108, No. B2, p. 2083, 2003.

Y. El-Manadili and K. Novak, "Precision rectification of SPOT imagery using the direct linear transformation model," *Photogramm. Eng. Remote Sens.*, vol. 62, No. 1, pp. 67-72, 1996.

Y. Fialko, M. Simons, and D. Agnew, "The complete (3-D) surface displacement field in the epicentral area of the 1999 Mw 7.1 Hector Mine earthquake, California, form space geodetic observations," Geophys. Res. Lett., vol. 28, No. 16, pp. 3063-3066, 2001.

D. Field, "Relations between the statistics of natural images and the response properties of cortical-cells," *J Opt. Soc. Amer. A, Opt. Image Sci.*, vol. 4, No. 12, pp. 2379-2394, 1987.

H. Foroosh, J. Zerubia, and M. Berthod, "Extension of phase correlation to subpixel registration," *IEEE Trans. Image Process.*, vol. 11, No. 3, pp. 188-200, Mar. 2002.

R. Gachet, "SPOTS in-flight commissioning: Inner orientation of HRG and HRS instruments," in Proc. XXth ISPRS Congr., Commission I, Istanbul, Turkey, 2004, vol. 35.

W. Hoge, "A subspace identification extension to the phase correlation method [mri application]," IEEE Trans. Med. Imag., vol. 22, No. 2, pp. 277-280, Feb. 2003.

K. Jacobsen, "Calibration of optical sensors," in Proc. ISPRS Commission I, Int. Calibration Orientation Workshop EuroCOW, Castelldefels, Spain, 2006.

C. Jayles and M. Costes, "Ten centimeters orbits in real-time onboard of a satellite, DORIS/DIODE current status," Acta Astronaut., vol. 54, No. 5, pp. 315-323, 2004.

R. Keys, "Cubic convolution interpolation for digital image processing," IEEE Trans. Acoust., Speech, Signal Process., vol. ASSP-29, No. 6, pp. 1153-1160, Dec. 1981.

Y. Klinger, R. Michel, and R. King, "Evidence for a barrier model from Mw 7.8 kokoxili (Tibet) earthquake slip-distribution," Earth Planet. Sci. Lett., vol. 242, No. 3/4, pp. 354-364, Feb. 2006.

C. Knapp and G. C. Carter, "The generalized correlation method for estimation of time delay," IEEE Trans. Acoust., Speech, Signal Process., vol. ASSP-24, No. 4, pp. 320-327, Aug. 1976.

C. Latry and B. Rouge, "Optimized sampling for CCD instruments: The Supermode scheme," in Proc. IGARSS, Jul. 2000, vol. 5, pp. 2322-2324.

S. Leprince, S. Barbot, F. Ayoub, and J. P. Avouac, "Automatic and precise orthorectification, coregistration, and subpixel correlation of satellite images, application to ground deformation measurements," IEEE Trans. Geosci. Remote Sens., vol. 45, No. 6, pp. 1529-1558,Jun. 2007.

S. Leprince, F. Ayoub, Y. Klinger, and J. P. Avouac, "Co-registration of optically sensed images and correlation (COSI-Corr): An operational methodology for ground deformation measurements," in Proc. IGARSS, Barcelona, Spain, Jul. 2007, vol. 6, pp. 1943-1946.

S. Leprince, E. Berthier, F. Ayoub, C. Delacourt, and J. P. Avouac, "Monitoring earth surface dynamics with optical imagery," EOS, Trans. Amer. Geophys. Union, vol. 89, No. I, pp. 1-2, Jan. 2008.

J. Manton, R. Mahony, and Y. Hua, "The geometry of weighted low-rank approximations," IEEE Trans. Signal Process., vol. 51, No. 2, pp. 500-514, Feb. 2003.

D. Massonnet, M. Rossi, C. Carmona, F. Adragna, G. Peltzer, K. Feigl, and T. Rabaute, "The displacement field of the Landers earthquake mapped by radar interferometry," Nature, vol. 364, No. 6433, pp. 138-142, Jul. 1993.

R. Michel and J.-P. Avouac, "Deformation due to the Aug. 17, 1999 lzmit, Turkey, earthquake measured from SPOT images," J. Geophys. Res., vol. 107, No. B4, p. 2062, 2002.

R. Michel, J. P. Avouac, and J. Taboury, "Measuring near field coseismic displacements from SAR images: Application to the Landers earthquake," Geophys. Res. Lett., vol. 26, No. 19, pp. 3017-3020, 1999.

G. Peltzer, F. Crampe, and P. Rosen, "The Mw 7.1, Hector Mine, California earthquake: Surface rupture, surface displacement field, and fault slip solution from ERS SAR data," C. R. Acad. Sci. Paris, Earth Planet. Sci., vol. 333, No. 9, pp. 545-555, 2001.

W. Pratt, "Correlation techniques of image registration," IEEE Trans. Aerosp. Electron. Syst., vol. AES-10, No. 3, pp. 353-358, May 1974.

S. Riazanoff, SPOT Satellite Geometry Handbook. Toulouse, France: SPOT Image, Jan. 2002.

C. Schiek, "Terrain change detection using ASTER optical satellite imagery along the Kunlun fault, Tibet," M.S. thesis, Univ. Texas, El Paso, TX, 2004. [Online]. Available:http://www.geo.utep.edu/pub/schiek/Cara_Schiek_Master_Thesis.pdf.

*Shuttle Radar Topography Mission*, 2000, JPL-NASA. [Online]. Available: http://www2.jpl.nasa.gov/srtm/statistics.html.

M. Simons, Y. Fialko, and L. Rivera, "Coseismic deformation from the 1999 Mw 7.1 Fialko Mine, California, earthquake as inferred from InSAR and GPS observations," Bull. Seismol. Soc. Amer., vol. 92, No. 4, pp. 1390-1402, 2002.

J. Snyder, *Map Projections—A Working Manual*, ser. U.S. Geological Survey Professional Paper 1395. Washington, DC: Government Printing Office, 1987.

*SPOT User's Handbook*, SPOT Image Corporation, Reston, VA, 1990.

H. Stone, M. Orchard, C. Ee-Chien, and S. Marlucci, "A fast direct Fourier-based algorithm for subpixel registration of images," IEEE Trans. Geosci. Remote Sens., vol. 39, No. 10, pp. 2235-2243, Oct. 2001.

I. Sutherland and G. Hodgman, "Reentrant polygon clipping," Commun. ACM, vol. 17, No. 1, pp. 32-42, Jan. 1974.

M. Sveldow, C. McGillem, and P. Anuta, "Image registration: Similarity measure and preprocessing method comparisons," IEEE Trans. Aerosp. Electron. Syst., vol. AES-14, No. 1, pp. 141-149, Jan. 1978.

M. Taylor, S. Leprince, J. P. Avouac, and K. Sieh, "Detecting coseismic displacements in glaciated regions: An example from the great Nov. 2002 Denali earthquake using SPOT horizontal offsets," *Earth Planet. Sci. Lett.*, 2007. to be published.

Y. Teshima and A. Iwasaki, "Correction of attitude fluctuation of Terra spacecraft using ASTERISWIR imagery with parallax observation," *IEEE Trans. Geosci. Remote Sens.*, vol. 46, No. 1, pp. 222-227, Jan. 2008.

D. Tolhurst, Y. Tadmor, and T. Chao, "Amplitude spectra of natural images," *Ophthalmic Physiol. Opt.*, vol. 12, No. 2, pp. 229-232, 1992.

J. Townshend, C. Justice, C. Gurney, and J. McManus, "The impact of misregistration on change detection," *IEEE Trans. Geosci. Remote Sens.*, vol. 30, No. 5, pp. 1054-1060, Sep. 1992.

J. A. Treiman, K. J. Kendrick, W. A. Bryant, T. K. Rockwell, and S. F. McGill, "Primary surface rupture associated with the Mw 7.1 Oct. 16, 1999 Hector Mine earthquake, San Bernardino County, California," *Bull. Seismol. Soc. Amer.*, vol. 92, No. 4, pp. 1171-1191, 2002.

H. Vadon and D. Massonnet, "Earthquake displacement fields mapped by very precise correlation. Complementarity with radar interferometry," in *Proc. IGARSS*, Honolulu, HI, Jul. 2000, vol. 6, pp. 2700-2702.

A. van der Schaaf and J. van Hateren, "Modeling the power spectra of natural images: Statistics and information," *Vis. Res.*, vol. 36, No. 17, pp. 2759-2770, 1996.

N. Van Puymbroeck, R. Michel, R. Binet, J.-P. Avouac, and J. Taboury, "Measuring earthquakes from optical satellite images," *Appl. Opt.*, vol. 39, No. 20, pp. 3486-3494, Jul. 2000.

T. Westin, "Interior orientation of Spot imagery," in *Proc. 27th ISPRS Congr., Commission I*, Washington, DC, 1992, vol. 29, pp. 193-198. 1558 IEEE Transactions on Geoscience and Remote Sensing, vol. 45, No. 6, Jun. 2007.

T. Westin, "Precision rectification of SPOT imagery," *Photogramm. Eng. Remote Sens.*, vol. 56, No. 2, pp. 247-253, 1990.

T. Westin, "Inflight calibration of SPOT CCD detector geometry," *Photogramm. Eng. Remote Sens.*, vol. 58, No. 9, pp. 1313-1319, Sep. 1992.

X. Li and H. Gotze, "Tutorial: Ellipsoid, geoid, gravity, geodesy, and geophysics," *Geophysics*, vol. 66, No. 6, pp. 1660-1668, 2001.

B. Zitova and J. Flusser, "Image registration methods: A survey," *Image Vis. Comput.*, vol. 21, No. II, pp. 977-1000, 2003.

Barisin, I., et al., Deformation measurements for the Sep. 2005 AFAR rifting event from sub-pixel correlation of SPOT images.

Berthier, E., et al., Recent rapid thinning of the "Mer de Glace" glacier derived from satellite optical images, Geophysical Research Letters 2004, 31: L17401-1-L17401-4.

CalTech Online Catalog, [Online], available: www.data.scec.org/catalog_search/date_mag_loc.php, retrieved on Mar. 18, 2011.

Delacourt, C., et al., Velocity field of the "La Clapiere" landslide measured by the correlation of aerial and QuickBird satellite images, Geophysical Research Letters 2004, 31: L15619-1-L15619-5.

Du, W., et al., Triggered aseismic fault slip from nearby earthquakes, static or dynamic effect?, Journal of Geophysical Research 2003, 108: 24-1-24-21.

Feigl, K., et al., Estimating slip distribution for the Izmit mainshock from coseismic GPS, ERS-1, RADARSAT, and SPOT measurements, Bulletin of the Seismological Society of America 2002, 92: 138-160.

Leprince, S., In-flight CCD distortion calibration for pushbroom satellites based on subpixel correlation, IEEE Transactions on Geoscience and Remote Sensing 2008, 46: 2675-2683.

Michel, R., et al., Coseismic surface deformation from air photo: The Kickapoo step over in the 1992 Landers rupture, Journal of Geophysical Research 2006, 111: B03408 1-13.

National Aerial Photography Program (NAPP), US Geological Survey. [Online]. Available: http://eros.usgs.gov/, retrieved on Mar. 18, 2011.

Schwarz, K.P., et al., An integrated INS/GPS approach to the georeferencing of remotely sensed data, Photogrammetric Engineering & Remote Sensing 1993, 59: 1667-1674.

Sieh, K., et al., Near-field investigations of the Landers earthquake sequence, Apr. to Jul. 1992, Science 1993, 260: 171-176.

Westin, T., Inflight calibration of SPOT CCD detector geometry, Photogrammetric Engineering & Remote Sensing 1992, 58: 1313-1319.

Klinger, Y., et al., High-resolution satellite imagery mapping of the surface rupture and slip distribution of the M-W similar to 7.8, Nov. 14, 2001 Kokoxili earthquake, Kunlun Fault, northern Tibet, China, Bulletin of the Seismological Society of America 2005, 95: 1970-1987.

National Elevation Dataset, US Geological Survey. [Online]. Available: http://ned.usgs.gov/, retrieved on Mar. 18, 2011.

Notice of Allowance mailed on Dec. 9, 2011 for U.S. Appl. No. 12/340,693, filed Dec. 20, 2008 in the name of Sebastien Leprince, et al.

\* cited by examiner

DISTORTION CALIBRATION FOR OPTICAL SENSORS

CROSS REFERENCE TO RELATED APPLICATIONS

The present application claims priority to U.S. Provisional Application No. 61/011,671 for "Automatic and Precise Ortho-Rectification, Coregistration, and Subpixel Correlation of Optical Satellite and Aerial Images" filed on Jan. 18, 2008, and to U.S. Provisional Application No. 61/066,407 for "In-flight CCD Distortion Calibration for Orbiting Optical Sensors Based on Subpixel Correlation" filed on Feb. 20, 2008, both of which are incorporated herein by reference in their entirety. The present application is also related to U.S. patent application Ser. No. 12/340,693 filed on even date herewith, for "Ortho-Rectification, Coregistration, and Subpixel Correlation of Optical Satellite and Aerial Images." Also this application is incorporated herein by reference in its entirety.

FEDERAL SUPPORT STATEMENT

The U.S. Government has certain rights in this invention persuant to Grant Nos. EAR0409652 and EAR0636097 awarded by the National Science Foundation.

FIELD

The present disclosure relates to imaging instruments. More particularly, it relates to methods and systems for calibrating imaging instruments, such as CCDs on an aircraft or satellite.

BACKGROUND

Current documentation on correction of CCD distortions of pushbroom satellites is based on SPOT (Satellite Pour l'Observation de la Terre) satellites.
A) Benefiting from the Dual Acquisition System HRV1 and HRV2 on Spot Satellites In [13] and [14], Westin describes a procedure to explicitly calibrate the CCD distortions of the SPOT 1 satellite. The SPOT 1, 2, 3, and 4 satellites are equipped with two similar instruments (HRV1 and HRV2) that can simultaneously acquire images and with different pointing angles thanks to their independent steering mirrors. Such acquisitions constitute stereo pairs with a base-to-height ratio equal to 0, and once projected on a common reference system [universal transverse Mercator (UTM)], the local disparities are formulated as the superposition of the distortions from both instruments. Distortions from each instrument can be separated using at least three such pairs, each pair having a different incidence angle difference. This technique works well but is of limited practical use. One practical problem is that the HRV1 and HRV2 instruments are usually not simultaneously acquiring scenes, and finding at least three such stereo pairs from the SPOT archives is challenging. However, this problem could easily be overcome by a special order of images if the satellite is still running. Another more serious limitation is that this method applies only to satellites having two optical systems that can simultaneously image the same area. In other words, this formulation is only valid for SPOT satellites and not for other satellites such as Quickbird, Ikonos, the IRS-1C satellite, etc., which do not possess a duplicate of their optical instrument, but which also exhibit troublesome CCD distortions [15], [16].

B) Along-Track Subtraction of Stacked Profiles

To correct the CCD-induced distortions in a correlation image like the one shown in FIG. 1 of the above mentioned U.S. Provisional Application No. 61/066,467, one may be tempted to simply use post-processing tools to remove the apparent artifacts. The exact and tedious modeling of the distortions then becomes unnecessary. For instance, one could think of removing the CCD artifacts from FIG. 1 of U.S. Provisional Application No. 61/066,467 by subtracting, in the satellites' along-track direction, stacked profiles taken where the displacement field is assumed to be zero. This is equivalent to subtracting the graph superimposed in FIG. 1 of U.S. Provisional Application No. 61/066,467 from the whole correlation image. Unfortunately, this method, proposed in [4], has two major drawbacks. First, the correlation image must possess large areas where the ground displacement is negligible, which is impractical in the case of images spanning a large earthquake. Second, this stacking technique simply does not work because the CCD-induced distortions on the ground depend on the topography. Hence, averaging non-constant ground distortions is meaningless. As an illustration, the circled artifacts in FIG. 1 of U.S. Provisional Application No. 61/066,467 cannot be canceled from stack subtraction since they show obvious heterogeneities in the along-track direction. These parallax artifacts result from the CCD distortions and cannot be the result of the digital elevation model (DEM) vertical inaccuracy. The pre- and post-earthquake images have an incidence angle difference of 8.1° and the national elevation dataset (NED) DEM has a vertical accuracy within 3 m [17]. Consequently, the ground disparity induced by the DEM parallax should not exceed 42 cm, and the ground disparities measured are comprised between 2 and 3 m. Hence, the topography-dependent artifacts circled in FIG. 1 of U.S. Provisional Application No. 61/066,467 are indeed produced by the CCD distortions.

SUMMARY

According to an aspect of the present disclosure, a method for calibrating an imaging instrument is provided, comprising: ortho-rectifying an image acquired by the imaging instrument; co-registering the acquired image with a reference image; correlating the acquired image with the reference image to measure disparities, on the ground, between the acquired image and the reference image; determining updated instrument pointing directions that correct for the disparities measured; and adopting the updated instrument pointing directions as corrective calibrations for instrument distortions.

Further aspects of the present disclosure are shown in the specification, figures and claims of the present application.

DETAILED DESCRIPTION

A) Assumptions and Notations

Applicants assume that the artifacts observed in the correlation images are due to a combination of non-separable distortions from the optical system and the CCD (charge-coupled device) elements, and they can all be modeled as positioning errors on the CCD element location in the focal plane [13]. For a given CCD element, the distortion can be considered constant over the time of acquisition of an image. The acquisition time is about 9 s for a SPOT image. Stationarity of CCD distortions over longer periods is discussed later.

To express applicants' internal orientation model that accounts for the CCD and optical distortions, applicants use the internal orientation representation developed for the SPOT satellites, where each CCD element is associated with a particular look direction [12].

Figure 1:
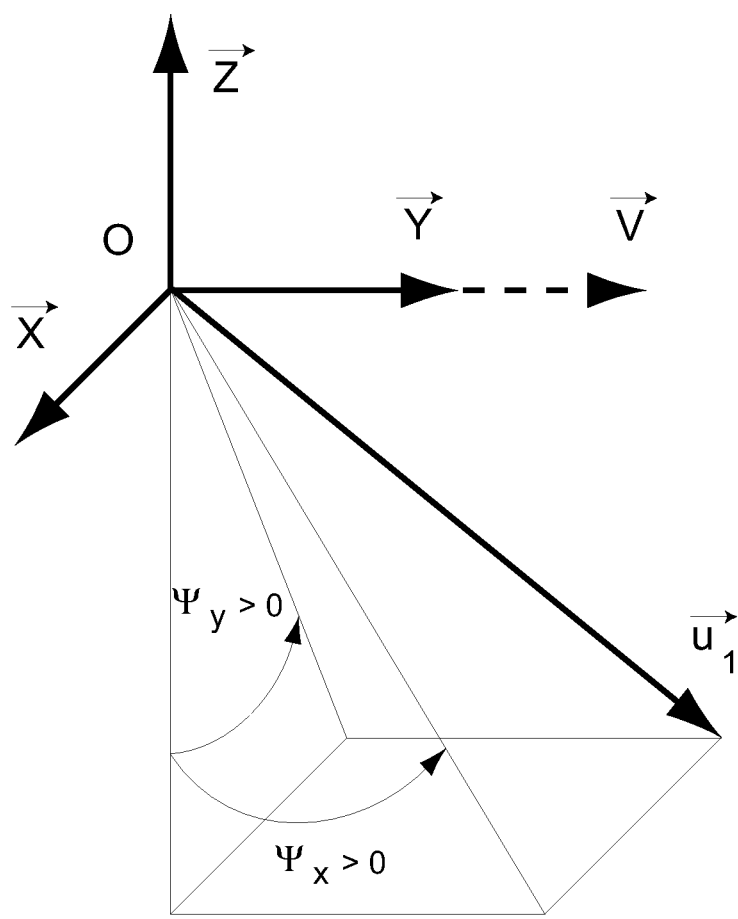
FIG. 1 shows notations for the representations used by applicants in the present disclosure.

The notations for such representation are reported in FIG. 1 of the present application. In particular, each CCD element p in the focal plane is characterized by a pointing direction $\vec{u}_1$, with origin the instrument's optical center O. These look directions are derived from the look angles ($\Psi_x$, $\Psi_y$), such that $\vec{u}_1(p)=[-\tan \psi_y(p), \tan \psi_x(p), -1]^T/K$, and with K such that $\|\vec{u}_1(p)\|_2=1$, for all p. The set of look directions is fixed over a given acquisition and models the satellite interior orientation. It is given in the spacecraft body fixed reference system, also called the Navigation Reference Coordinate System. At nominal attitude when the satellite roll, pitch and yaw are null angles, we have $\vec{Y}//\vec{V}$, $\vec{Z}//\vec{P}$, $\vec{X}=\vec{Y}\times\vec{Z}$, if $\vec{P}$ and $\vec{V}$ denote the satellite position and velocity vectors, respectively.

The calibrated interior orientation of a slave image is derived from the correlation analysis between the slave image and a reference image that is assumed bias free and perfectly orthorectified. This reference image should largely overlap with the slave image to be calibrated, because the non-overlapping parts cannot be calibrated. For example, it could be a mosaic of high-resolution aerial photographs orthorectified at the resolution of the slave image [18].

According to a non-limiting example shown in the present disclosure, the reference image can be a SPOT 5-HRG1 panchromatic image. The SPOT 5 sensor is composed of a single CCD line array that is accurately calibrated [18] and that has shown no detectable bias during correlation analysis [1]. The ⅓ arcsec (~9 m) NED DEM [17] is used for orthorectification purpose. Its resolution is thought to be sufficient to produce orthorectified images with negligible parallax effects if the images are free of modeling distortions.

B) Methodology

CCD distortions induce subtle disparities in the images that account for at most a small fraction of the pixel size. Therefore, the slave raw image should be perfectly orthorectified (in the sense that residual orthorectification errors should be less than the expected calibration accuracy) and co-registered with the reference, except for the CCD distortions that should be unambiguously measured. This is achieved thanks to accurate ground control points (GCPs) that correct for the satellite exterior orientation errors and that are generated between the raw slave image and the orthorectified reference using subpixel correlation. In particular, the ortho-rectification, co-registration and GCP generation procedures disclosed in S. Leprince, S. Barbot, F. Ayoub, and J. P. Avouac, "Automatic and precise orthorectification, coregistration and subpixel correlation of satellite images, application to ground deformation measurements," IEEE Trans. Geosci. Remote Sens., vol. 45, no. 6, pp. 1529-1558, June 2007 and the above mentioned U.S. patent application Ser. No. 12/340,693, for "Ortho-Rectification, Coregistration, and SubPixel Correlation of Optical Satellite and Aerial Images", now U.S. Pat. No. 8,121,433, both of which are incorporated herein by reference, can be used.

The result of the correlation analysis between a SPOT 5-HRG1 panchromatic reference image and a SPOT 4-HRV1 slave image is shown, for example, in FIG. 4 of U.S. Provisional Application No. 61/066,467 for "In-flight CCD Distortion Calibration for Orbiting Optical Sensors Based on Subpixel Correlation" mentioned above and FIG. 4 of S. Leprince, P. Muse, and J. P. Avouac, "In-Flight CCD Distortion Calibration for Pushbroom Satellites Based on Subpixel Correlation," IEEE Trans. Geosci. Remote Sens., vol. 46, no. 9, pp. 2675-2683, September 2008, both of which are incorporated herein by reference in their entirety. The disparity field shows linear artifacts attributed to the SPOT 4 CCD distortions. No other biases are visible, meaning that precise orthorectification and coregistration have been achieved. In particular, the exterior orientation is satisfyingly modeled as no oscillating pattern is observed (typical for roll, pitch, or yaw variation residuals [2], [19]).

B1) Orthorectification Model

The orthorectification model for the slave image, as detailed, by way of example and not of limitation, in [1] and in the related "Ortho-Rectification, Coregistration, and Subpixel Correlation of Optical Satellite and Aerial Images." application Ser. No. 12/340,396, of the form $$M(p)=O(p)+\lambda[T(p)R(p)\vec{u}_1(p)+\vec{\delta}(p)],$$

where:

M is the point on the ground seen by the pixel p,

O is the position of the optical center in space when p was being acquired $\vec{u}_1$ is the interior look direction of the pixel p as defined in FIG. 1

R is a 3D rotation matrix that accounts for the satellite roll, pitch, and yaw when p was being acquired T is a system reference change matrix from the orbital to the terrestrial coordinates system δ is the correction brought on the orthorectification model by the GCPs to ensure precise co-registration of the orthorectified salve and the reference images λ is some positive scaling number such that the ray defined by $O(p)+\lambda \vec{u}(p)$ intersect the topography surface as defined by the DEM at M.

Ground control points (GCPs) are automatically derived with high accuracy by optimizing δ on some designated pixels of the raw image, called image control points (ICPs), such that orthorectified patches centered on those ICPs have an average co-registration with the reference image as accurate as possible, as measured using subpixel correlation.

In practice, applicants do not distinguish between the instrument optical center and the satellite center of mass, and δ is a linear correction on each of the X, Y, Z component of the terrestrial look direction $T(p)R(p)\vec{u}_1(p)$. Although δ has the potential of correcting any defect from both the interior and exterior orientations, the linear correction mostly corrects for attitude drifts of the satellite. Applicants then next consider that δ corrects for any bias of the external orientation and that remaining biases are only due to distortions from the interior orientation, i.e., the CCD distortions.

Given a pixel p, the direct orthorectification model determines its projection M on the ground.

B2) Calibration

According to an embodiment of the present disclosure, a method for calibrating an imaging instrument located, e.g., on an aircraft or satellite, is shown.

Figure 2:
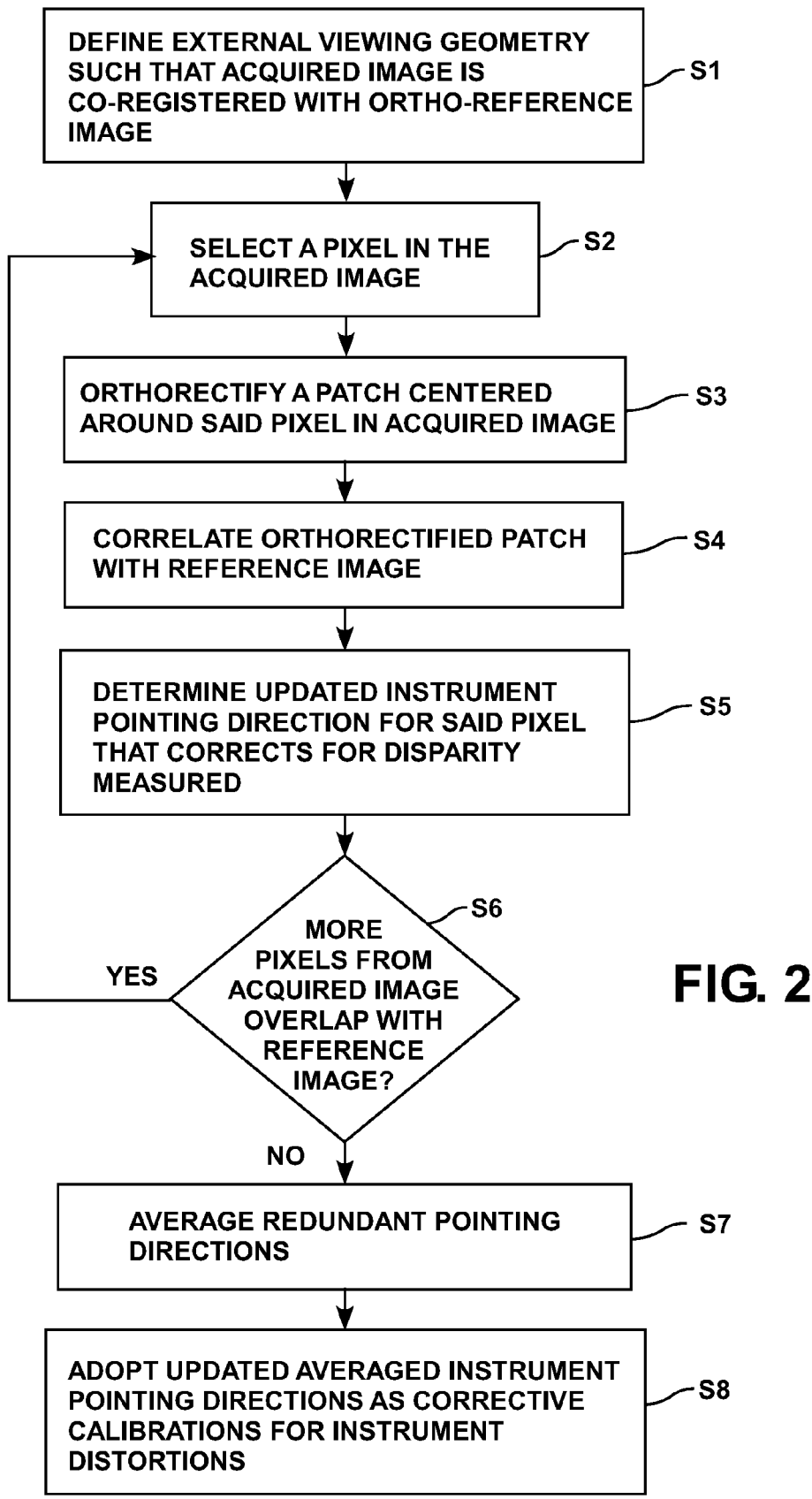
FIG. 2 is a flow chart describing an embodiment of the calibration method according to the present disclosure.

As generally discussed with reference to FIG. 2, an external viewing geometry is defined such that the acquired image is co-registered with the ortho-reference image (S1), and a pixel is selected in the acquired image (S2). A patch centered around the pixel in the acquired image is orthorectified (S3) and then correlated with the reference image (S4). On the basis of the steps above, an updated instrument pointing direction is determined for such pixel to correct the disparity measured (S5). If more pixels from the acquired image overlap with the reference image (S6), then steps S2-S5 are repeated again. Otherwise, the flow proceeds to step S7, where redundant pointing directions are averaged and step S8, where the updated averaged instrument pointing directions are adopted as corrective calibrations for the instrument distortions.

The updated instrument pointing directions can be determined through projection of the disparities on a plane associated with the imaging instrument, e.g., a focal plane of the imaging instrument.

Figure 3:
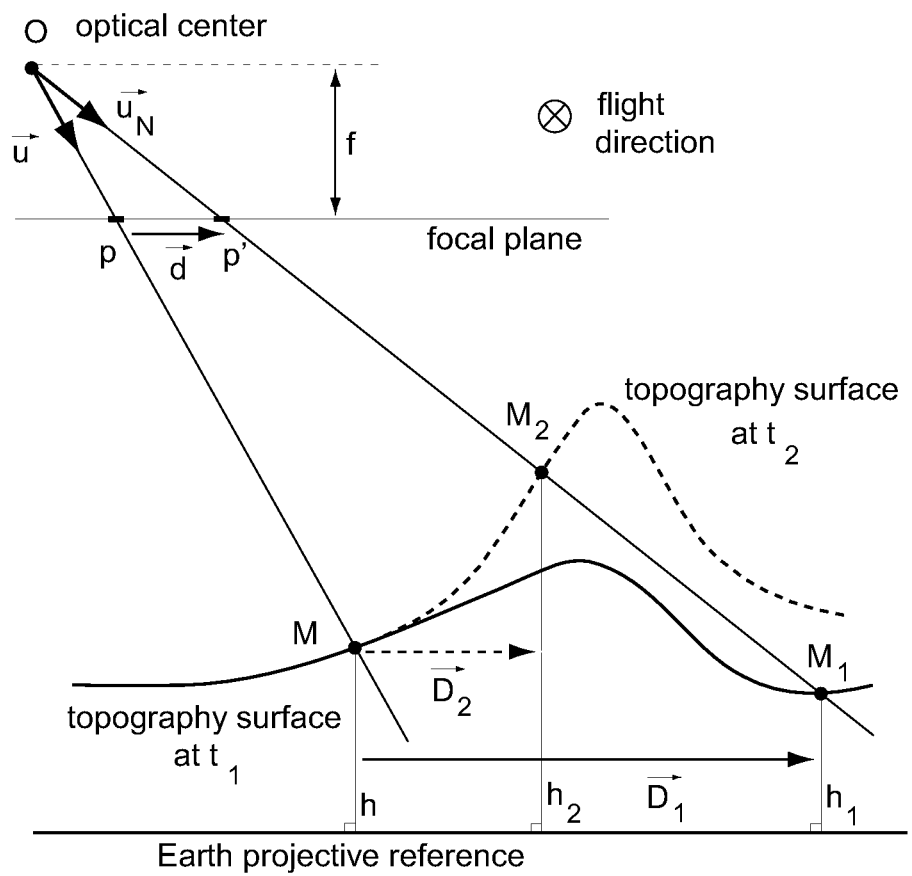
FIG. 3 shows a diagram associated to a further embodiment of the present disclosure.

More in detail, given the orthorectification model, the following procedure, also shown in FIG. 3 of the present application, can be used to compute the calibrated look direction $\vec{u}_N$ for all pixels in the slave image.

In general, it is assumed that a particular pixel is thought to be imaging a scene from the position p in the satellite focal plane. It is also assumed that the optical system is sustaining some distortion, constant over time, that can be modeled as if this particular pixel p was in fact seeing the scene from the position p' in the focal plane. This distortion is called $\vec{d}=\vec{pp'}$. Then, orthorectify, co-register and correlate the distorted image with a distortion-free reference image through, e.g., the procedures of [1]. If at a particular acquisition time $t_1$, the topography of the scene is represented by the solid black line (100) shown in FIG. 3, then the ground disparity measured from correlation is $\vec{D}_1$. Since $\vec{d}$ is assumed constant over time, if the topography is instead represented by the dotted line at time $t_2$, the ground disparity measured will be $\vec{D}_2 \neq \vec{D}_1$. Hence the ground disparities measured from the correlation of orthorectified images depend on the topography variations and cannot be averaged. This makes clear that CCD distortions should bias the production of digital elevation models from stereoscopic images [13]. The distortion in the focal plane $\vec{d}$ is retrieved using the observed ground distortion. If at the time $t_1$ the pixel p sees the ground point M and the ground disparity $\vec{D}_1$ is measured, it means that the pixel p should have seen the ground point $M_1=M+\vec{D}_1$, at elevation $h_1$, instead. The problem of determining $\vec{d}$ is therefore equivalent to determining the new camera unitary pointing vector $\vec{u}_N$ of the pixel p, such that p sees the ground point $M_1$ when projected according to $\vec{u}_N$.

In particular, the following steps can be performed:

1. Call M the ground projection of the pixel p by the direct model orthorectification. Orthorectify the raw slave image onto a 32×32 pixels patch P centered at M.

2. Compute the disparity $\vec{D}_1$ between P and the orthorectified reference image using subpixel correlation.

3. Find $M_1=M+\vec{D}_1$. Assign to $M_1$ its elevation $h_1$ according to the DEM.

4. Determine the new interior orientation look direction $\vec{u}_N$ such that $M_1(p)=O(p)+\lambda_1[T(p)R(p)\vec{u}_N(p)+\vec{\delta}(p)]$, for some $\lambda_1>0$, and under the constraint $\|\vec{u}_N(p)\|_2=1$. This yields $$\vec{u}_N(p) = R^T(p)T^T(p)\left(\frac{\vec{OM}_1}{\lambda_1} - \vec{\delta}(p)\right),$$

with $\lambda_1$ determined from the constraint $\vec{u}_N \cdot \vec{u}_N = 1$, which gives $$\lambda_1 = \frac{\vec{OM}_1 \cdot \vec{\delta} - \sqrt{\left(\vec{OM}_1 \cdot \vec{\delta}\right)^2 - \left(\|\vec{\delta}\|^2 - 1\right)\|\vec{OM}_1\|^2}}{\|\vec{\delta}\|^2 - 1}.$$

We indeed have $\lambda_1>0$ since $\|\vec{\delta}\|^2<1$. Physically, this means that the correction on the orthorectification model has a smaller magnitude than the pointing vector to be corrected. This should always be true when the satellite is imaging its specified ground target.

5. Iterate for all pixels in the raw slave image that overlap with the reference image. See the Appendix at the end of the specification of the present application for details.

This procedure yields a calibration for each CCD element. It provides maximum redundancy because it is carried out for all lines in the raw image. Because pointing vectors (or look directions) are characteristic of the camera, they can be assumed constant over the image scanning time for a given CCD element, and they are "averaged" to give a more accurate calibration. For a given CCD element, averaging all the pointing vectors $\vec{u}_N^i$ means finding the unitary vector $\langle\vec{u}_N\rangle$ such that its direction is the mean direction of all unitary vectors $\vec{u}_N^i$. This is equivalent to finding $\langle\vec{u}_N\rangle$ that satisfies $\langle\vec{u}_N\rangle = \arg\min_{\vec{u}} \Sigma_i \|\vec{u} - \vec{u}_N^i\|^2$ for $\|\vec{u}\|=1$. Equivalently, the spherical coordinates angles $(\theta_N, \psi_N)$ of $\langle\vec{u}_N\rangle$ are the minimizers of $$f(\theta, \varphi) = \sum_i \left(1 - \vec{u} \cdot \vec{u}_N^i\right),$$

for $\vec{u}=(\sin\psi\cos\theta, \sin\psi\sin\theta, \cos\psi)^T$.

If we let A, B, and C denote the coordinates of the vector $\Sigma_i \vec{u}_N^i$ in the spacecraft body fixed reference system, i.e., $A=\Sigma_i \vec{u}_N^i \cdot \vec{X}$, $B=\Sigma_i \vec{u}_N^i \cdot \vec{Y}$, $C=\Sigma_i \vec{u}_N^i \cdot \vec{Z}$, we find $$\theta_N = \arctan\left(\frac{B}{A}\right),$$

$$\varphi_N = \arctan\left(\frac{A\cos\theta_N + B\sin\theta_N}{C}\right),$$

by equating the partial derivatives of $f(\theta, \psi)$ to zero. For each CCD element, a mean calibrated look direction $\langle\vec{u}_N\rangle$ can then be determined. In practice, to limit bias in the mean calibration, only calibration measurements resulting from a correlation with high signal to noise ratio, and with ground disparities comprised within a physical range of a few meters are used.

At this point, the interior orientation of the aircraft or satellite is fully calibrated and it is worth noting that no a priori knowledge on the camera parameters such as the focal length or the CCD sampling step in the focal plane have been used. The resulting calibration is therefore not biased even when these parameters are not known with enough accuracy.

It has been previously stated that the distortions of the optical system were primarily due to positioning errors of the CCD elements in the focal plane. Now that the camera interior orientation is calibrated, the focal plane distortions $\vec{d}$ (see FIG. 3) can be determined, if desired, by looking at the difference between the projection of the calibrated and non-calibrated look directions $<\vec{u}_N>$ and $\vec{u}_1$ in the focal plane. We have:

$$\vec{d} = (d_x, d_y, 0)^T$$
$$= p' - p$$
$$= \frac{f}{r}\left[\frac{\langle \vec{u}_N \rangle}{|\langle u_N(z)\rangle|} - \frac{\vec{u}_1}{|u_1(z)|}\right],$$

where f is the instrument estimated focal length, r is the sampling step of the CDD array, and u(z) is the Z component of $\vec{u}$, i.e., $u(z)=\vec{u}\cdot\vec{Z}$. For the SPOT4 instrument, Applicants used r=13 μm [12]. The exact value of the focal length varies slightly depending on authors, and Applicants followed, in one example, the recommendation of [13] using f=1084 mm.

Figure 4:
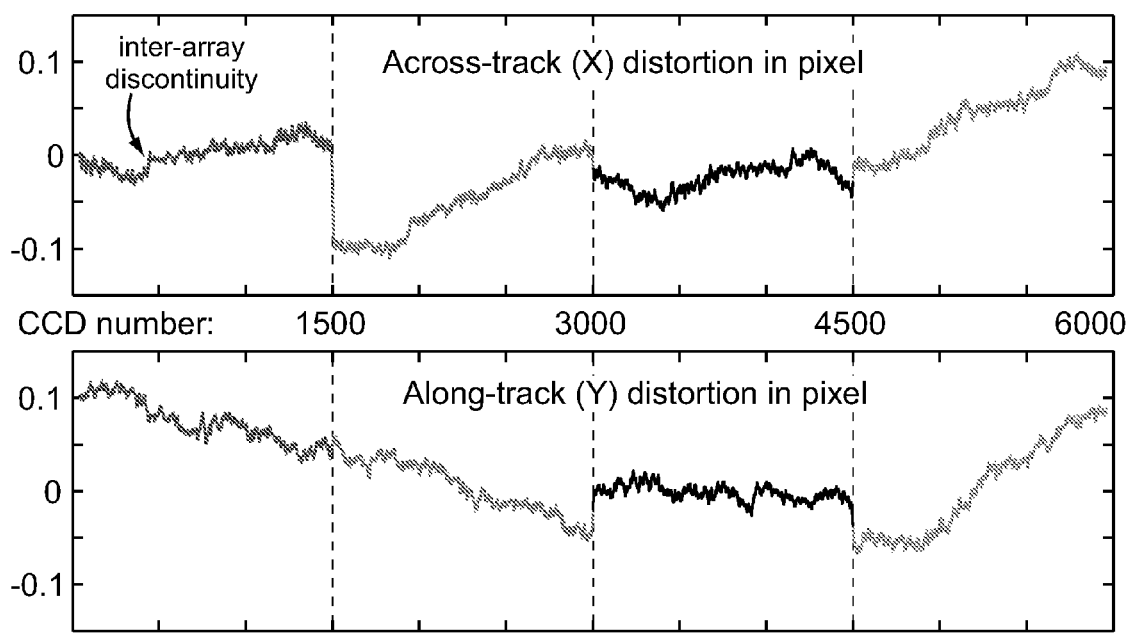
FIG. 4 shows components $d_x$ and $d_y$ of the distortion $\vec{d}$ measured in the focal plane of a sensor.

FIG. 4 shows each component, across-track $d_x$ and along-track $d_y$, of the distortion $\vec{d}$ measured in the focal plane of the SPOT4-HRV1 panchromatic sensor. Discontinuities are clearly seen on the edge of each CCD array at pixels multiples of 1500. The uncertainty of this calibration model is better than 0.01 pixel rms, and shows significant CCD distortions even within each single CCD array.

B3) SPOT Steering Mirror and Correction Model

The SPOT interior orientation look directions $\vec{u}_1$ account for the modeling of the steering mirror [20]. Therefore, the correction devised above cannot be applied directly to another image from the same sensor, acquired with a different incidence angle. The rotation matrix $R_M$ modeling the effect of the lateral steering mirror is now introduced:

$$R_M = \begin{pmatrix} \cos(\Theta) & 0 & -\sin(\Theta) \\ 0 & 1 & 0 \\ \sin(\Theta) & 0 & \cos(\Theta) \end{pmatrix},$$

where $\Theta$ is a rotation angle around the Y axis (see FIG. 1). From the SPOT ancillary data, Applicants compute $\Theta=(s-48)\times 0.6°$, where s is the step encoding the mirror rotation. The correction model for the SPOT 1, 2, 3, and 4 satellites can then be defined as:

$$\vec{d}u_0(p)=R_M^T[<\vec{u}_N(p)>-\vec{u}_1(p)],$$

for all the 6000 pixels p constituting the line sensor. In our particular example, the slave SPOT4-HRV1 panchromatic image has a mirror step s=46, hence $\Theta=-1.2°$. This allows Applicants to propose a general correction model for this particular sensor, assuming that the CCD distortions do not change over time. To apply this correction to another image from the same sensor, say to the image I, Applicants correct the given interior orientation look directions $\vec{u}_1(p)_I$, for all pixels p, according to:

$$\vec{u}_N(p)_I=\vec{u}_1(p)_I+R_{M_I}\vec{d}u_0(p),$$

where $R_{M_I}$ is the mirror rotation matrix associated with the image I, which is assumed constant for a given image. No images are indeed acquired when the mirror is rotating, and a safety lag time is set to allow the mirror position to rest until potential oscillations become negligible [21].

C) Appendix: Determining the Overlap Between the Slave and the Reference Images

To avoid unnecessary computations during calibration, it is important to determine beforehand the region in the raw slave image, which, once projected on the ground, will overlap with the orthorectified reference image. This can be accomplished automatically, with the following algorithm:

1—Extract the ground coordinates (UTM) of the four corners of the orthorectified reference image. This defines a convex 4-polygon, $P_1$.

2—Determine the ground coordinates (UTM) of the raw slave image corners using the direct orthorectification model. This defines a second 4-polygon $P_2$ in the orthorectified domain.

3—Compute the intersection of the interior of these two 4-polygons. This can be solved using Sutherland-Hodgman's polygon clipping algorithm [25]. The intersection is a new polygon $P_3$ in the orthorectified domain.

4—Map $P_3$ from the orthorectified domain to the geometry of the raw slave image. This is done by applying the inverse orthorectification model on each vertex of $P_3$.

5—The projection of $P_3$ in the raw slave image plane is assumed to be the polygon, $P_4$, delimited by the inverse projection of the $P_3$ vertices. $P_4$ is then shrunk by the size of the correlation window that will be used during calibration to avoid edge effects, producing the polygon $P_5$. Distortions are then estimated for all pixels in the raw slave image that are contained within the $P_5$ polygon.

In summary, according to some of the embodiments of the present disclosure, methods and systems are disclosed that allow for accurate in-flight calibration of the interior orientation of any pushbroom camera, and that in particular solve the problem of modeling the distortions induced by CCD misalignments.

The distortion induced on the ground by each CCD can be measured using subpixel correlation between the orthorectified image to be calibrated and an orthorectified reference image that is assumed distortion-free. Distortions can be modeled as camera defects, which can be assumed constant over time. Applicants' results show that, according to some examples of the present disclosure, in-flight interior orientation calibration reduces internal camera biases by one order of magnitude. In particular, according to some examples of the present disclosure, Applicants fully characterize and model the SPOT 4-HRV1 sensor, and conjecture that distortions mostly result from mechanical strain produced when the satellite was launched, rather than from effects of on-orbit thermal variations or aging. The derived calibration models have been integrated to the software package Co-registration of Optically Sensed Images and Correlation (COSI-Corr), available from the Caltech Tectonics Observatory website. Such calibration models are particularly useful in reducing biases in DEMs generated from stereo matching, and in improving the accuracy of change detection algorithms.

The entire disclosure of each document cited (including patents, patent applications, journal articles, abstracts, laboratory manuals, books, or other disclosures) in the present disclosure, including the list of references, is hereby incorporated herein by reference.

It is to be understood that the disclosures are not limited to particular methods, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

A number of embodiments of the disclosure have been described. Nevertheless, it will be understood that various modifications may be made without departing from the spirit and scope of the present disclosure. Accordingly, other embodiments are within the scope of the following claims.

LIST OF REFERENCES

[1] S. Leprince, S. Barbot, F. Ayoub, and J. P. Avouac, "Automatic and precise orthorectification, coregistration and subpixel correlation of satellite images, application to ground deformation measurements," *IEEE Trans. Geosci. Remote Sens.*, vol. 45, no. 6, pp. 1529-1558, June 2007.

[2] S. Leprince, F. Ayoub, Y. Klinger, and J. P. Avouac, "Coregistration of optically sensed images and correlation (COSI-Corr): An operational methodology for ground deformation measurements," in *Proc. IGARSS*, Barcelona, Spain, July 2007, vol. 6, pp. 1943-1946.

[3] J. P. Avouac, F. Ayoub, S. Leprince, O. Konca, and D. Helmberger, "The 2005, Mw 7.6 Kashmir earthquake, rupture kinematics from sub-pixel correlation of ASTER images and seismic waveforms analysis," *Earth Planet. Sci. Lett.*, vol. 249, no. 3/4, pp. 514-528, September 2006.

[4] N. Van Puymbroeck, R. Michel, R. Binet, J.-P. Avouac, and J. Taboury, "Measuring earthquakes from optical satellite images," *Appl. Opt.*, vol. 39, no. 20, pp. 3486-3494, July 2000.

[5] Y. Klinger, R. Michel, and R. King, "Evidence for a barrier model from Mw 7.8 kokoxili (Tibet) earthquake slip-distribution," *Earth Planet. Sci. Lett.*, vol. 242, no. 3/4, pp. 354-364, February 2006.

[6] R. Binet and L. Bollinger, "Horizontal coseismic deformation of the 2003 Bam (Iran) earthquake measured from SPOT-5 THR satellite imagery," *Geophys. Res. Lett.*, vol. 32, no. 2, L02 307, 2005.

[7] S. Dominguez, J.-P. Avouac, and R. Michel, "Horizontal coseismic deformation of the 1999 Chi-Chi earthquake measured from SPOT satellite images: Implications for the seismic cycle along the western foothills of central Taiwan," *J. Geophys. Res.*, vol. 108, no. B2, 2083, 2003.

[8] S. Leprince, E. Berthier, F. Ayoub, C. Delacourt, and J. P. Avouac, "Monitoring earth surface dynamics with optical imagery," *EOS, Trans. Amer. Geophys. Union*, vol. 89, no. 1, pp. 1-2, January 2008.

[9] E. Berthier, H. Vadon, D. Baratoux, Y. Arnaud, C. Vincent, K. Feigl, F. Remy, and B. Legresy, "Surface motion of mountain glaciers derived from satellite optical imagery," *Remote Sens. Environ.*, vol. 95, no. 1, pp. 14-28, March 2005.

[10] M. Taylor, S. Leprince, J. P. Avouac, and K. Sieh, "Detecting coseismic displacements in glaciated regions: An example from the great November 2002 Denali earthquake using SPOT horizontal offsets," *Earth Planet. Sci. Lett.*, 2007. to be published.

[11] S. Leprince, E. Berthier, F. Ayoub, C. Delacourt, and J. P. Avouac, "Monitoring Earth surface dynamics with optical imagery," in *Proc. Amer. Geophys. Union—Fall Meeting*, San Francisco, Calif., December 2007.

[12] *SPOT User's Handbook*, SPOT Image Corp., Reston, Va., 1990.

[13] T. Westin, "Inflight calibration of SPOT CCD detector geometry," *Photogramm. Eng. Remote Sens.*, vol. 58, no. 9, pp. 1313-1319, September 1992.

[14] T. Westin, "Interior orientation of SPOT imagery," in *Proc. XVIIth ISPRS Congr., Commission I*, Washington D.C., 1992, vol. 29, pp. 193-198.

[15] E. Baltsavias, Z. Li, and H. Eisenbeiss, "DSM generation and interior orientation determination of IKONOS images using a testfield in Switzerland," in *Proc. ISPRS Workshop High-Resolution Earth Imaging Geospatial Inf.*, Hannover, Germany, 2005.

[16] K. Jacobsen, "Calibration of optical sensors," in *Proc. ISPRS Commission I, Int. Calibration Orientation Workshop EuroCOW*, Castelldefels, Spain, 2006.

[17] *National elevation dataset*, Reston, Va.: U.S. Geol. Survey. [Online]. Available: http://ned.usgs.gov/

[18] R. Gachet, "SPOT5 in-flight commissioning: Inner orientation of HRG and HRS instruments," in *Proc. XXth ISPRS Congr., Commission I*, Istanbul, Turkey, 2004, vol. 35.

[19] Y. Teshima and A. Iwasaki, "Correction of attitude fluctuation of Terra spacecraft using ASTER/SWIR imagery with parallax observation," *IEEE Trans. Geosci. Remote Sens.*, vol. 46, no. 1, pp. 222-227, January 2008.

[20] S. Riazanoff, *SPOT Satellite Geometry Handbook*. Toulouse, France: SPOT Image, January 2002.

[21] E. Breton, A. Bouillon, R. Gachet, and F. Delussy, "Preflight and in-flight geometric calibration of SPOT5 HRG and HRS images," in *Proc. ISPRS Commission I Symp., Pecora 15/Land Satellite Inf. IV Conf.*, Denver, Colo., 2002.

[22] I. Barisin, S. Leprince, J. P. Avouac, B. Parsons, and T. Wright, "Deformation measurement for the September 2005 AFAR rifting event from subpixel correlation of spot images," in *Proc. Amer. Geophys. Union—Fall Meeting*, San Francisco, Calif., December 2007.

[23] A. Bouillon, E. Breton, F. D. Lussy, and R. Gachet, "SPOT5 HRG and HRS first in-flight geometry quality results," in *Proc. SPIE—Sensors, Systems, Next-Generation Satellites VI*, 2003, vol. 4881, pp. 212-223.

[24] A. Almansa, B. Rougé, and S. Jaffard, "Irregular sampling in satellite images and reconstruction algorithms," in *Proc. 35th CANUM*, June 2003. [Online]. Available: http://www.fing.edu.uy/~amansa/HDR/Almansa2003-CANUM-psample.pdf

[25] I. Sutherland and G. Hodgman, "Reentrant polygon clipping," *Commun. ACM*, vol. 17, no. 1, pp. 32-42, January 1974.

The invention claimed is:

1. A method for calibrating an interior orientation of optical elements of an imaging instrument with respect to the imaging instrument, to correct for distortions of the optical elements inside the imaging instrument, said distortions corresponding to interior pointing directions with respect to the imaging instrument to be corrected, the method comprising:

ortho-rectifying a region of an image acquired by the imaging instrument;

co-registering the acquired image with a reference image;

correlating the ortho-rectified region of the acquired image with the reference image to measure disparities between the ortho-rectified region of the acquired image and the reference image;

determining updated interior pointing directions with respect to the imaging instrument that correct for the disparities measured;

adopting a representation of the updated interior pointing directions with respect to the imaging instrument as corrective calibrations for the imaging instrument distortions; and performing the corrective calibrations on the optical elements of the imaging instrument to calibrate the interior orientation of the optical elements with respect to the imaging instrument.

2. The method of claim 1, wherein the updated interior pointing directions with respect to the imaging instrument are determined through projection of the disparities on a plane associated with the imaging instrument.

3. The method of claim 2, wherein the plane is a focal plane of the imaging instrument.

4. The method of claim 1, wherein the disparities between the ortho-rectified region of the acquired image and the reference image are measured pixel by pixel and the imaging instrument distortions are pixel by pixel distortions.

5. The method of claim 1, wherein the reference image is a bias free, perfectly ortho-rectified reference image.

6. The method of claim 1, wherein the optical elements are CCDs and the image is an image acquired through the CCDs.

7. The method of claim 6, wherein the imaging instrument distortions are induced through misalignments of the CCDs.

8. The method of claim 1, wherein the imaging instrument is located on an aircraft or satellite.

9. The method of claim 1, wherein the imaging instrument distortions are constant over time.

10. The method of claim 1, wherein distortions of further images acquired through the imaging instrument are corrected by applying the steps of claim 1 after a further correction taking into account rotation of the imaging instrument.

11. The method of claim 1, wherein co-registering the acquired image with the reference image comprises determining an overlap region between the acquired image and the reference image.

12. The method of claim 1, wherein the imaging instrument is calibrated during use of the imaging instrument.

13. The method of claim 1, wherein the representation of the updated interior pointing directions with respect to the imaging instrument is based on an average of the updated interior pointing directions.

* * * * *